US008441469B2

(12) United States Patent
Sang et al.

(10) Patent No.: US 8,441,469 B2
(45) Date of Patent: May 14, 2013

(54) LIQUID CRYSTAL DISPLAY DEVICE

(75) Inventors: Woo-Kyu Sang, Paju-si (KR); Ju-Young Lee, Gumi-si (KR); Yun-Sung Yang, Daegu (KR)

(73) Assignee: LG Display Co., Ltd., Seoul (KR)

( * ) Notice: Subject to any disclaimer, the term of this patent is extended or adjusted under 35 U.S.C. 154(b) by 387 days.

(21) Appl. No.: 12/654,756

(22) Filed: Dec. 30, 2009

(65) Prior Publication Data

US 2010/0315392 A1 Dec. 16, 2010

(30) Foreign Application Priority Data

Jun. 12, 2009 (KR) ........................ 10-2009-0052396

(51) Int. Cl.
*G06F 3/038* (2006.01)
*G09G 3/36* (2006.01)
*G01D 9/28* (2006.01)
*G02F 1/1335* (2006.01)

(52) U.S. Cl.
USPC ............... 345/205; 345/87; 345/102; 346/45; 349/69

(58) Field of Classification Search .................. 210/744; 345/87–88, 102, 211, 214, 691; 349/62, 349/110, 69; 358/1.15; 361/749; 370/360; 346/45, 69
See application file for complete search history.

(56) References Cited

U.S. PATENT DOCUMENTS

| | | | | |
|---|---|---|---|---|
| 6,977,640 | B1 | 12/2005 | Baek et al. | |
| 2004/0085371 | A1* | 5/2004 | Lee et al. | 346/45 |
| 2005/0128717 | A1* | 6/2005 | Chuang et al. | 361/749 |
| 2006/0007086 | A1* | 1/2006 | Rhee et al. | 345/87 |
| 2006/0022968 | A1* | 2/2006 | Kondo et al. | 345/211 |
| 2007/0091059 | A1* | 4/2007 | Kang | 345/102 |
| 2008/0122828 | A1* | 5/2008 | Xiao et al. | 345/212 |
| 2008/0231776 | A1* | 9/2008 | Shin et al. | 349/69 |
| 2010/0277519 | A1* | 11/2010 | Lee | 345/691 |
| 2010/0315574 | A1* | 12/2010 | Mizuuchi et al. | 349/62 |

FOREIGN PATENT DOCUMENTS

| | | |
|---|---|---|
| CN | 101266762 A | 9/2008 |
| KR | 10-2007-0099087 | 10/2007 |
| KR | 10-0870498 | 10/2008 |

* cited by examiner

*Primary Examiner* — Quan-Zhen Wang
*Assistant Examiner* — Lin Li
(74) *Attorney, Agent, or Firm* — McKenna, Long & Aldridge, LLP.

(57) ABSTRACT

A liquid crystal display (LCD) device capable of reducing the number of printed circuit boards (PCBs) and the number of signal transmitters, and thus reducing manufacturing costs, is disclosed. The LCD device includes a liquid crystal panel having a display to display an image, a plurality of data drive integrated circuits (ICs) connected between one-side portion of the liquid crystal panel and a source PCB, to drive data lines arranged on the display of the liquid crystal panel, a light source unit to provide light to the liquid crystal panel, and a unified board formed with a light source driver to drive the light source unit, and a drive circuit to drive the data drive ICs.

1 Claim, 9 Drawing Sheets

LIQUID CRYSTAL DISPLAY DEVICE

This application claims the benefit of the Korean Patent Application No. 10-2009-0052396 filed on Jun. 12, 2009 which is hereby incorporated by reference for all purposes as if fully set forth herein.

BACKGROUND OF THE INVENTION

1. Field of the Invention

The present invention relates to a liquid crystal display (LCD) device, and more particularly, to an LCD device capable of reducing the number of printed circuit boards (PCBs) and the number of signal transmitters, and thus reducing manufacturing costs.

2. Discussion of the Related Art

LCD devices display an image by controlling the light transmittance of liquid crystal using an electric field. To this end, such an LCD device includes a liquid crystal panel having pixel regions arranged in the form of a matrix, and a drive circuit to drive the liquid crystal panel.

On the liquid crystal panel, a plurality of gate lines and a plurality of data lines are arranged such that they intersect each other. Pixel regions are formed in regions defined by intersections of the gate lines and data lines, respectively. Pixel electrodes and common electrodes are also formed on the liquid crystal panel, to apply electric fields to the pixel regions, respectively.

A conventional LCD device requires a large number of PCBs such as an optical drive circuit PCB mounted with an inverter, a source PCB mounted with a drive circuit, and a control PCB. For this reason, the number of signal transmitters to connect the PCBs in the LCD device is also increased.

In the conventional LCD device, accordingly, there is an increase in costs because large numbers of PCBs and signal transmitters should be used,

SUMMARY OF THE INVENTION

Accordingly, the present invention is directed to a liquid crystal display device that substantially obviates one or more problems due to limitations and disadvantages of the related art.

An advantage of the present invention is to provide a liquid crystal display device capable of reducing the number of plural printed circuit boards (PCBs) and the number of plural signal transmitters by unifying the PCBs into one PCB, and mounting an optical driver and a drive circuit on the unified PCB, and thus reducing manufacturing costs.

Additional advantages, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a liquid crystal display device comprises: a liquid crystal panel having a display to display an image; a plurality of data drive integrated circuits connected between one-side portion of the liquid crystal panel and a source printed circuit board, to drive data lines arranged on the display of the liquid crystal panel; a light source unit to provide light to the liquid crystal panel; and a unified board formed with a light source driver and a drive circuit, wherein the light source driver drives the light source unit, and the drive circuit drives the data drive integrated circuits.

The unified board may be electrically connected with the source printed circuit board by a signal transmitter.

The display may be divided into a first display and a second display. The source printed circuit board may be divided into first and second printed circuit boards electrically connected by a first signal transmitter. The data drive integrated circuits may be divided into first and second data drive integrated circuits. The first data drive integrated circuits may be connected between the one-side portion of the liquid crystal panel and the first source printed circuit board. The second data drive integrated circuits may be connected between the one-side portion of the liquid crystal panel and the second source printed circuit board. The first source printed circuit board and the unified board may be electrically connected by a second signal transmitter.

The liquid crystal display device may further comprise a system to generate a light source unit control signal to control an operation of the light source unit, and a drive circuit control signal to control an operation of the drive circuit, and to supply the light source unit control signal to the light source driver while supplying the drive circuit control signal to the drive circuit.

The system may comprise a first connector having a plurality of output pins to output the light source unit control signal, and a second connector having a plurality of output pins to output the drive circuit control signal.

The system may comprise a connector having a plurality of first output pins to output the light source unit control signal, and a plurality of second output pins to output the drive circuit control signal.

The drive circuit may comprise a timing controller and a DC-DC converter. The drive circuit control signal may comprise a data signal, various control signals, and a voltage signal. The timing controller may supply the data signal and the control signals to the data drive integrated circuits in accordance with a timing. The DC-DC converter may step up or down a voltage level of the voltage signal, to supply various drive voltages, and supplies the drive voltages to the data drive integrated circuits.

In another aspect of the present invention, a liquid crystal display device comprises: a liquid crystal panel having a display to display an image; a plurality of data drive integrated circuits connected between a one-side portion of the liquid crystal panel and a unified board, to drive data lines arranged on the display of the liquid crystal panel; and a light source unit to provide light to the liquid crystal panel, wherein the unified board is formed with a light source driver and a drive circuit, wherein the light source driver drives the light source unit, and the drive circuit drives the data drive integrated circuits.

The liquid crystal display device may further comprise a system to generate a light source unit control signal to control an operation of the light source unit, and a drive circuit control signal to control an operation of the drive circuit, and to supply the light source unit control signal to the light source driver while supplying the drive circuit control signal to the drive circuit.

The system may comprise a first connector having a plurality of output pins to output the light source unit control signal, and a second connector having a plurality of output pins to output the drive circuit control signal.

The system may comprise a connector having a plurality of first output pins to output the light source unit control signal, and a plurality of second output pins to output the drive circuit control signal.

In another aspect of the present invention, a liquid crystal display device comprises: a liquid crystal panel having first and second displays to display an image; a plurality of first data drive integrated circuits connected between a one-side portion of the liquid crystal panel and a first source printed circuit board, to drive data lines arranged on the first display of the liquid crystal panel; a plurality of second data drive integrated circuits connected between the one-side portion of the liquid crystal panel and a second source printed circuit board, to drive data lines arranged on the second display of the liquid crystal panel; a light source unit to provide light to the liquid crystal panel; and a unified board formed with a light source driver and a drive circuit, wherein the light source driver drives the light source unit, and the drive circuit drives the first and second data drive integrated circuits, wherein the unified board electrically connects the first and second source printed circuit boards.

The light source unit may comprise a plurality of light sources. The light sources may be divided into two parts respectively arranged at opposite portions of the liquid crystal panel. The light source driver may generate first and second light source drive signals to drive the light source unit, and may supply the first light source drive signal to the light sources arranged at one portion of the liquid crystal panel while supplying the second light source drive signal to the light sources arranged at the other portion of the liquid crystal panel.

The light source driver may comprise a plurality of light sources. The light sources may be arranged at one-side portion of the liquid crystal panel. The light source driver may generate a light source drive signal to drive the light source unit, and may supply the light source drive signal to the light sources arranged at the one-side portion of the liquid crystal panel.

In another aspect of the present invention, a liquid crystal display device comprises: a liquid crystal panel having first and second displays to display an image; a plurality of first data drive integrated circuits connected between a one-side portion of the liquid crystal panel and a first unified board, to drive data lines arranged on the first display of the liquid crystal panel; a plurality of second data drive integrated circuits connected between the one-side portion of the liquid crystal panel and a second unified board, to drive data lines arranged on the second display of the liquid crystal panel; a light source unit to provide light to the liquid crystal panel; and a signal transmitter connected between the first unified board and the second unified board, wherein the first unified board is formed with a first light source driver to drive a plurality of first light sources included in the light source unit; the second unified board is formed with a second light source driver to drive a plurality of second light sources included in the light source unit; and a drive circuit to drive the first and second data drive integrated circuit is formed on one of the first and second unified boards.

The liquid crystal display device may further comprise a system to generate a first light source unit control signal to control an operation of the first light source driver, a second light source unit control signal to control an operation of the second light source driver, and a drive circuit control signal to control an operation of the drive circuit, and to supply the generated control signals to the first and light source drivers, and drive circuit.

The first light source unit control signal may be supplied to the first light source driver via the first unified board. The second light source unit control signal may be supplied to the second light source driver via the first unified board, the signal transmitter, and the second unified board.

In another aspect of the present invention, a liquid crystal display device comprises: a liquid crystal panel having a display to display an image; a plurality of data drive integrated circuits connected between a one-side portion of the liquid crystal panel and a unified board, to drive data lines arranged on the display of the liquid crystal panel; and a light source unit to provide light to the liquid crystal panel, wherein the unified board UB is formed with a light source driver and a drive circuit, wherein the light source driver drives the light source unit, and the drive circuit drives the data drive integrated circuits.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First Embodiment

Figure 1:
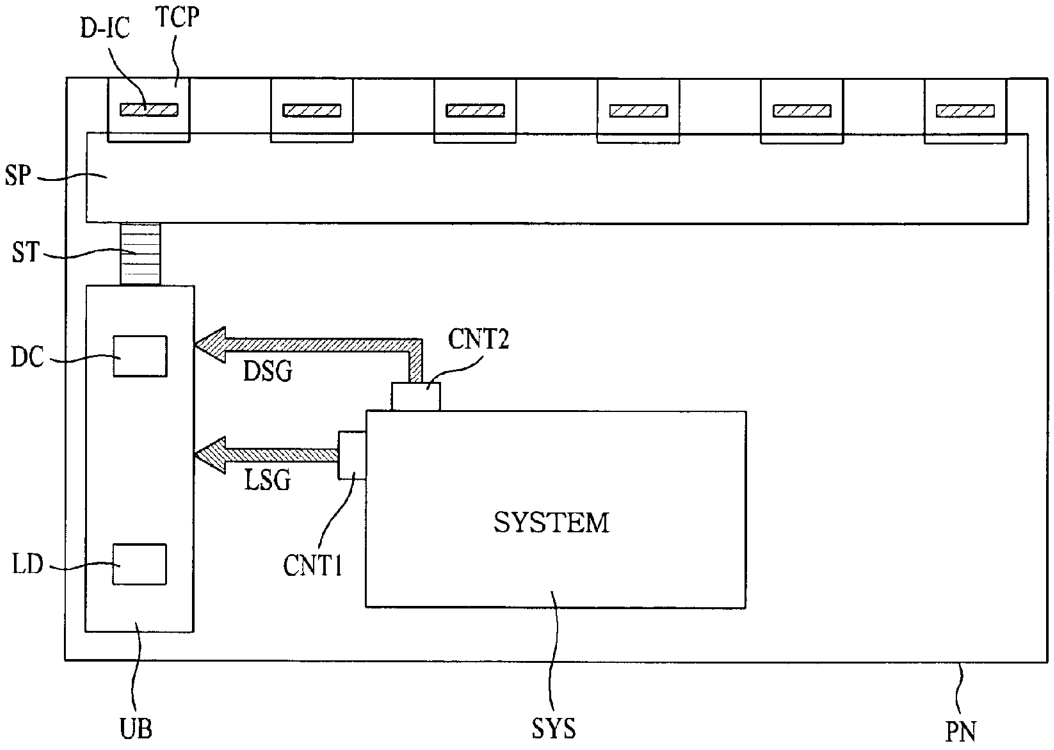
FIG. 1 is a view illustrating a liquid crystal display (LCD) device according to a first embodiment of the present invention.

FIG. 1 is a view illustrating a liquid crystal display (LCD) device according to a first embodiment of the present invention.

As shown in FIG. 1, the LCD device according to the first embodiment of the present invention includes a liquid crystal panel PN having a display to display an image, a plurality of data drive integrated circuits (ICs) D-IC connected between a one-side portion of the liquid crystal panel PN and a source printed circuit board (PCB) SP, to drive data lines arranged on the display of the liquid crystal panel PN, and a light source unit to provide light to the liquid crystal panel PN. The LCD device also includes a unified board UB formed with a light source driver LD to drive the light source unit, and a drive circuit DC to drive the data drive ICs D-IC.

Each data drive IC D-IC is connected between the corresponding source PCB SP and the liquid crystal panel PN in a state in which the data drive IC D-IC is mounted on a tape carrier package TCP.

Although not shown, the LCD device further includes a plurality of gate lines arranged on the liquid crystal panel PN such that the gage lines intersect with the data lines. Also, the LCD device includes a plurality of gate drive ICs to drive the gate lines.

FIG. 1 shows a back surface of the LCD device. In FIG. 1, the display of the liquid crystal panel PN is not shown.

The light source unit includes a plurality of light sources to emit light. Each light source may be a fluorescent lamp such as an external electrode fluorescent lamp (EEFL) or a cold cathode fluorescent lamp (CCFL), or a light emitting diode (LED).

Where a fluorescent lamp is used for each light source, the light source driver LD may be an inverter. On the other hand, where an LED is used for each light source, the light source driver LD may be an LED driver.

In accordance with the first embodiment of the present invention, it is possible to reduce the number of PCBs used in the LCD device as the light source driver LD and drive circuit DC are mounted on one unified board UB, different from the conventional case in which the light source driver LD and drive circuit DC are mounted on separate PCBs, respectively. Accordingly, it is possible to reduce the number of signal transmitters to connect the PCBs. Thus, a reduction in costs is achieved as the numbers of PCBs and signal transmitters are reduced.

In the conventional case, the light driver LD is mounted on an optical drive circuit PCB, whereas the drive circuit DC is mounted on a control PCB. However, the unified board UB in the first embodiment of the present invention functions as the optical drive circuit PCB and control PCB.

The unified board UB is electrically connected to the source PCB SP via a signal transmitter ST. The signal transmitter may be a flexible printed circuit or a flexible flat cable.

Meanwhile, the LCD device further includes a system SYS. The system SYS generates a light source unit control signal LSG to control operation of the light source unit LD, and a drive circuit control signal DSG to control operation of the drive circuit DC. The system SYS supplies the light source unit control signal LSG to the light source driver LD while supplying the drive circuit control signal DSG to the drive circuit DC.

The system SYS includes first and second connectors CNT1 and CNT2. The first connector CNT1 includes a plurality of output pins to output the light source unit control signal LSG. The second connector CNT2 includes a plurality of output pins to output the drive circuit control signal DSG.

Although not shown, the unified board UB includes third and fourth connectors. The third connector is connected to the first connector CNT1 via a first signal transmitter, whereas the fourth connector is connected to the second connector CNT2 via a second signal transmitter.

The light source unit control signal LSG, which is output through the first connector CNT1 of the system SYS, is transmitted to the third connector via the first signal transmitter. The third connector supplies the light source unit control signal LSG to the light source unit LD via a plurality of first transmission line patterns formed on the unified board UB. The drive circuit control signal DSG, which is output through the second connector CNT2 of the system SYS, is transmitted to the fourth connector via the second signal transmitter. The fourth connector supplies the drive circuit control signal DSG to the drive circuit DC via a second transmission line patterns formed on the unified board UB.

The light source driver LD, which receives the light source unit control signal LSG, generates a light source drive signal, and supplies the light source drive signal to the light sources, thereby causing the light sources to emit light. The drive circuit DC, which receives the drive circuit control signal DSG, generates a data signal, various control signals, various drive voltages, and a gamma voltage, and supplies the signals and voltages to the data drive ICs D-IC via the signal transmitter ST. Although not shown, the control signals and drive voltages are also supplied to the gate drive ICs.

The drive circuit DC includes a timing controller and a DC-DC converter. The timing controller generates data control signals and gate control signals using a horizontal sync signal, a vertical sync signal, and a clock signal, and supplies the control signals to the corresponding data drive ICs and gate drive ICs, respectively. The data control signals include a dot clock, a source shift clock, a source enable signal, a polarity inverting signal, etc. The gate control signals include a gate start pulse, a gate shift clock, a gate out enable signal, etc. The gate control signals are input to the gate driver.

Each data drive IC D-IC samples data in accordance with a data control signal DSC supplied from the timing controller, latches the sampled data for one line in every horizontal period 1H, 2H, , , , and supplies the latched data to the corresponding data lines. That is, each data drive IC D-IC converts the data supplied from the timing controller into an analog pixel signal, using the gamma voltage input from a gamma voltage generator, and supplies the analog pixel signal to the corresponding data lines.

Each gate drive IC includes a shift register to generate a scan pulse in a sequential manner in response to the gate start pulse included in the gate control signals supplied from the timing controller, and a level shifter to shift the voltage of the scan pulse to a voltage level suitable for driving of liquid crystal cells. Each gate drive IC sequentially supplies a gate high voltage to the corresponding gate line in response to the gate control signal.

The DC-DC converter steps up or down the voltage level of the voltage supplied from the system SYS, to supply various drive voltages required in the timing controller, data drive ICs D-IC, and gate drive ICs, a gamma reference voltage required to generate the gamma voltage, etc. The DC-DC converter also supplies a gate high voltage corresponding to a high voltage of the scan pulse, and a gate low voltage corresponding to a low voltage of the scan pulse.

Second Embodiment

Figure 2:
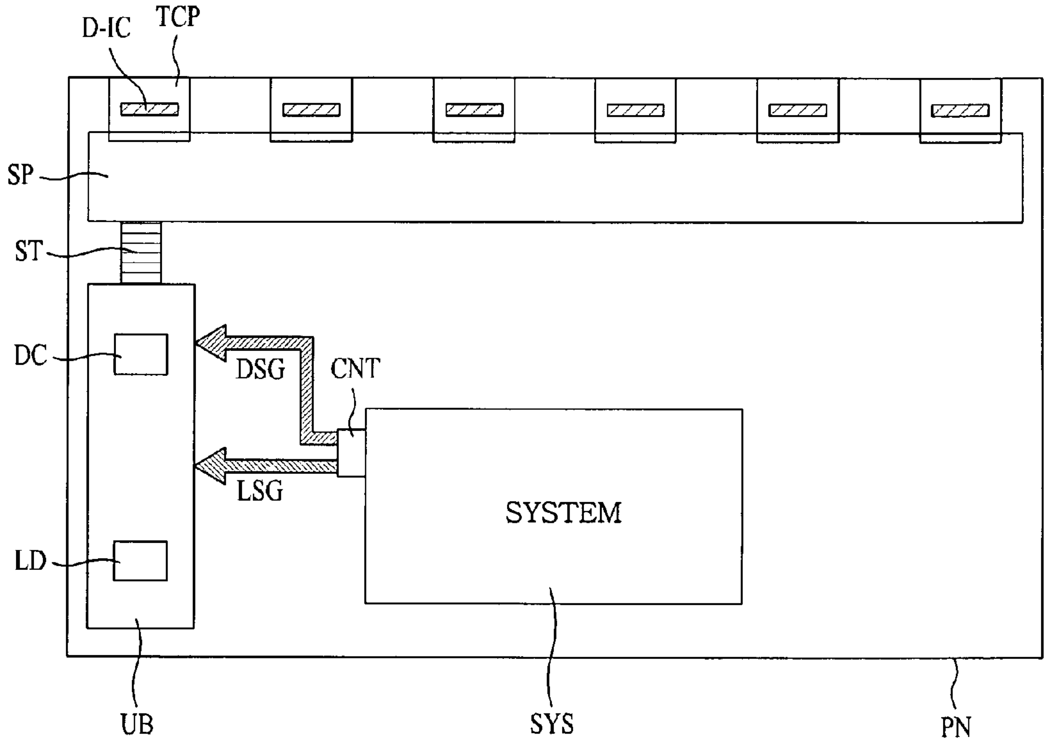
FIG. 2 is a view illustrating an LCD device according to a second embodiment of the present invention.

FIG. 2 is a view illustrating an LCD device according to a second embodiment of the present invention.

The LCD device according to the second embodiment of the present invention is similar to that of the first embodiment. However, the system SYS included in the LCD device according to the second embodiment of the present invention includes a single connector CNT, as shown in FIG. 2. The connector CNT includes a plurality of first output pins to output the light source unit control signal LSG, and a plurality of second output pins to output the drive circuit control signal DSG.

Third Embodiment

Figure 3:
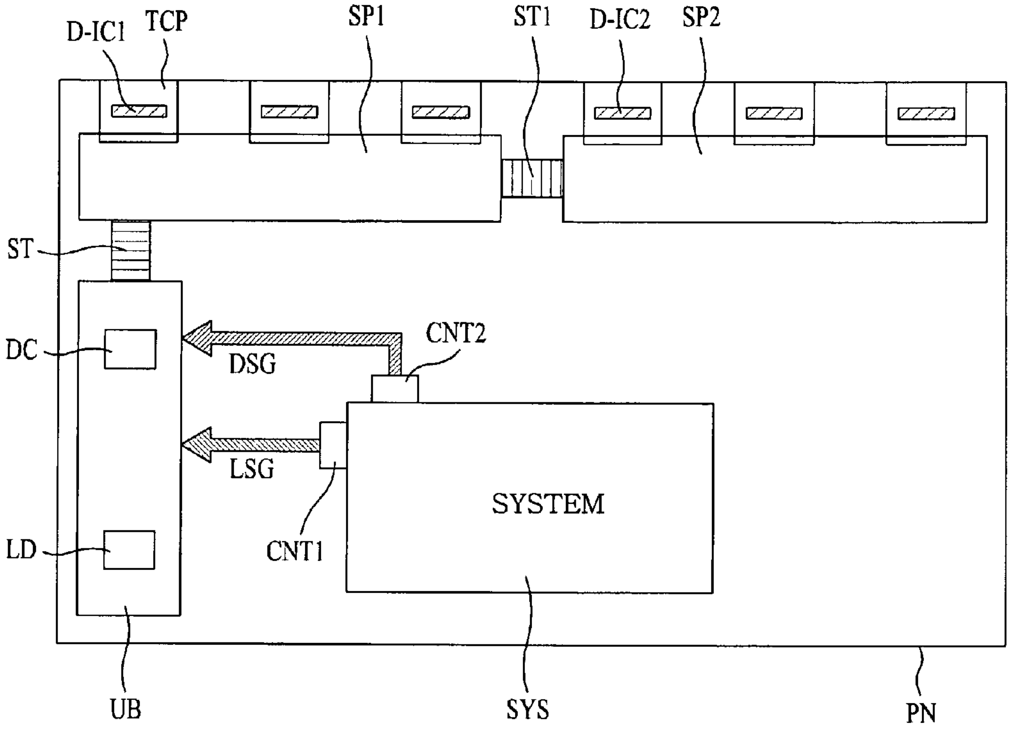
FIG. 3 is a view illustrating an LCD device according to a third embodiment of the present invention.

FIG. 3 is a view illustrating an LCD device according to a third embodiment of the present invention.

The LCD device according to the third embodiment of the present invention is similar to that of the first embodiment. However, the source PCB included in the LCD device according to the third embodiment of the present invention is divided into two portions, as shown in FIG. 3. That is, the source PCB is divided into a first source PCB SP1 and a second source PCB SP2. The first and second PCBs SP1 and SP2 are electrically connected by a first signal transmitter ST1.

Also, the data drives ICs are divided into first data drive ICs D-IC1 and second data drive ICs D-IC2, as shown in FIG. 3. The first data drive ICs D-IC1 are connected between a one-side portion of the liquid crystal panel PN and the first source PCB SP1, wherein the second data drive ICs D-IC2 are connected between the one-side portion of the liquid crystal panel PN and the second source PCB SP2.

The first data drive ICs D-IC1 drive the data lines of a first display, whereas the second data drive ICs D-IC2 drive the data lines of a second display.

As shown in FIG. 3, the first source PCB SP1 and unified board UB are electrically connected by the second signal transmitter ST2.

Fourth Embodiment

Figure 4:
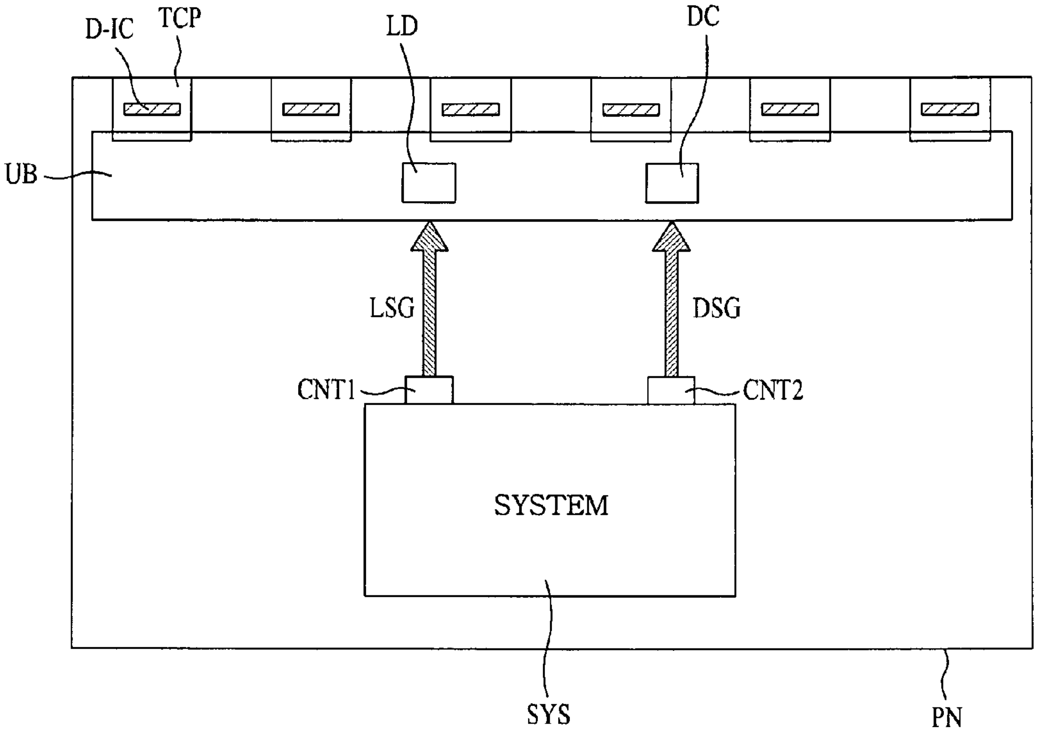
FIG. 4 is a view illustrating an LCD device according to a fourth embodiment of the present invention.

FIG. 4 is a view illustrating an LCD device according to a fourth embodiment of the present invention.

As shown in FIG. 4, the LCD device according to the fourth embodiment of the present invention includes a liquid crystal panel PN having a display to display an image, a plurality of data drive ICs D-IC connected between a one-side portion of the liquid crystal panel PN and a unified board UB, to drive data lines arranged on the display of the liquid crystal panel PN, and a light source unit to provide light to the liquid crystal panel PN. The unified board UB is formed with a light source driver LD to drive the light source unit, and a drive circuit DC to drive the data drive ICs D-IC.

The LCD device according to the fourth embodiment of the present invention further includes a system SYS. The system SYS generates a light source unit control signal LSG to control operation of the light source unit LD, and a drive circuit control signal DSG to control operation of the drive circuit DC. The system SYS supplies the control signals LSG and DSG to the light source driver LD and drive circuit DC via the unified board UB, respectively.

The system SYS includes a first connector CNT1 having a plurality of output pins to output the light source unit control signal LSG, and a second connector CNT2 having a plurality of output pins to output the drive circuit control signal DSG.

In accordance with the fourth embodiment of the present invention, the unified board UB has the function of the source PCB SP, the function of the control PCB, and the function of the optical drive circuit PCB.

Fifth Embodiment

Figure 5:
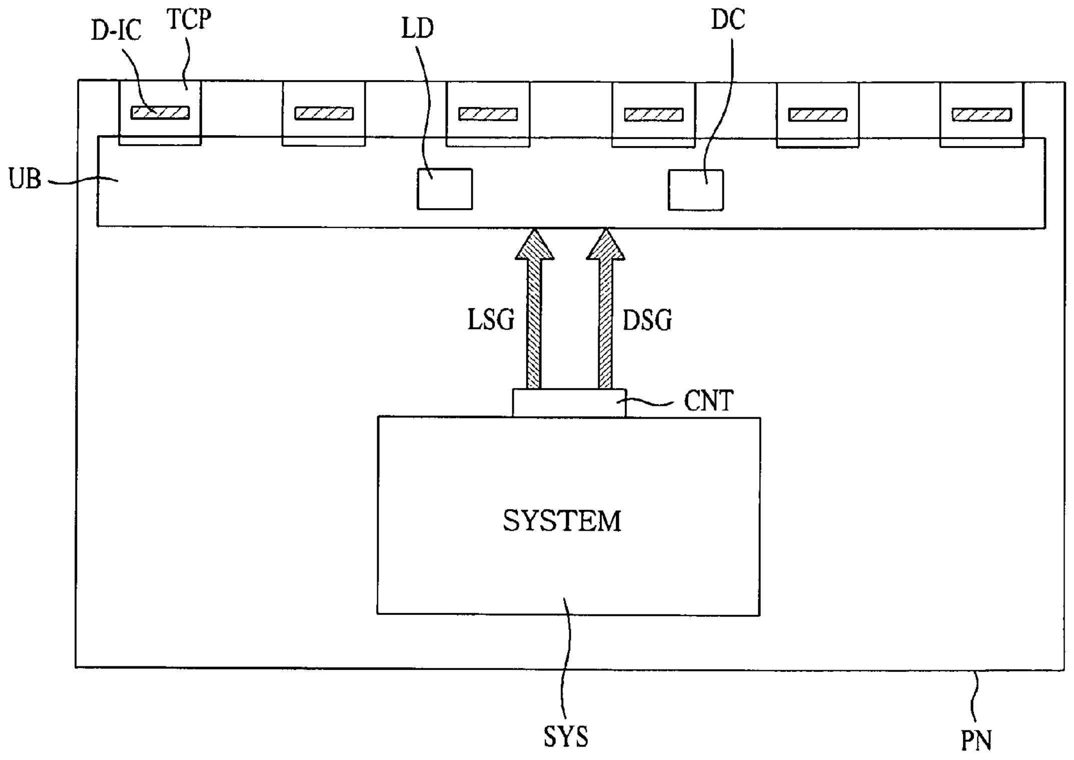
FIG. 5 is a view illustrating an LCD device according to a fifth embodiment of the present invention.

FIG. 5 is a view illustrating an LCD device according to a fifth embodiment of the present invention.

The LCD device according to the fifth embodiment of the present invention is similar to that of the fourth embodiment. However, the system SYS included in the LCD device according to the fifth embodiment of the present invention includes a single connector CNT, as shown in FIG. 5. The connector CNT includes a plurality of first output pins to output the light source unit control signal LSG, and a plurality of second output pins to output the drive circuit control signal DSG.

Sixth Embodiment

Figure 6:
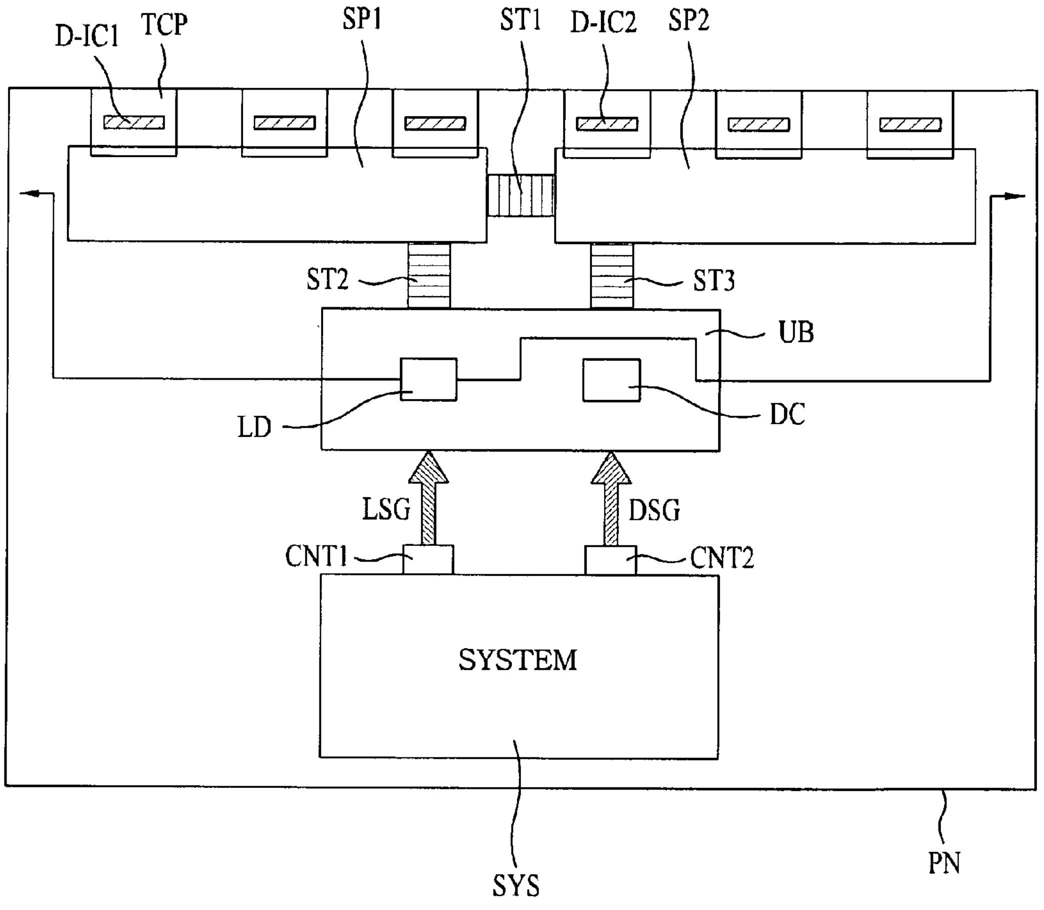
FIG. 6 is a view illustrating an LCD device according to a sixth embodiment of the present invention.

FIG. 6 is a view illustrating an LCD device according to a sixth embodiment of the present invention.

As shown in FIG. 6, the LCD device according to the sixth embodiment of the present invention includes a liquid crystal panel PN having first and second displays to display an image, a plurality of first data drive ICs D-IC1 connected between a one-side portion of the liquid crystal panel PN and a first source PCB SP1, to drive data lines arranged on the first display of the liquid crystal panel PN, a plurality of second data drive ICs D-IC2 connected between the one-side portion of the liquid crystal panel PN and a second source PCB SP2, to drive data lines arranged on the second display of the liquid crystal panel PN, and a light source unit to provide light to the liquid crystal panel PN. The LCD device also includes a unified board UB formed with a light source driver LD to drive the light source unit, and a drive circuit DC to drive the first and second data drive ICs D-IC1 and D-IC2. The unified board UB electrically connects the first and second source PCBs SP1 and SP2.

The unified board UB is connected to the first source PCB SP1 via a second signal transmitter ST2 while being connected to the second source PCB SP2 via a third signal transmitter ST3.

The light source driver LD mounted on the unified board UB generates first and second light source drive signals, and supplies the first and second light source drive signals to the light source unit.

The light source unit includes a plurality of light sources to emit light. A part of the light sources are arranged along one edge of the liquid crystal panel PN, whereas the remaining light sources are arranged along the other edge of the liquid crystal panel PN.

The first light source drive signal from the light source driver LD is supplied to the light sources arranged along the one-side edge of the liquid crystal panel PN, whereas the second light source drive signal from the light source driver LD is supplied to the light sources arranged along the other-side edge of the liquid crystal.

The LCD device according to the sixth embodiment of the present invention further includes a system SYS. The system SYS generates a light source unit control signal LSG to control operation of the light source unit LD, and a drive circuit control signal DSG to control operation of the drive circuit DC. The system SYS supplies the control signals LSG and DSG to the light source driver LD and drive circuit DC via the unified board UB.

The system SYS includes a first connector CNT1 having a plurality of output pins to output the light source unit control signal LSG, and a second connector CNT2 having a plurality of output pins to output the drive circuit control signal DSG.

Meanwhile, the system SYS may have a single connector in place of the two connectors. In this case, the single connector includes a plurality of first output pins to output the light source unit control signal LSG, and a plurality of second output pins to output the drive circuit control signal DSG.

In accordance with the sixth embodiment of the present invention, the unified board UB has the function of the control PCB and the function of the optical drive circuit PCB.

Seventh Embodiment

Figure 7:
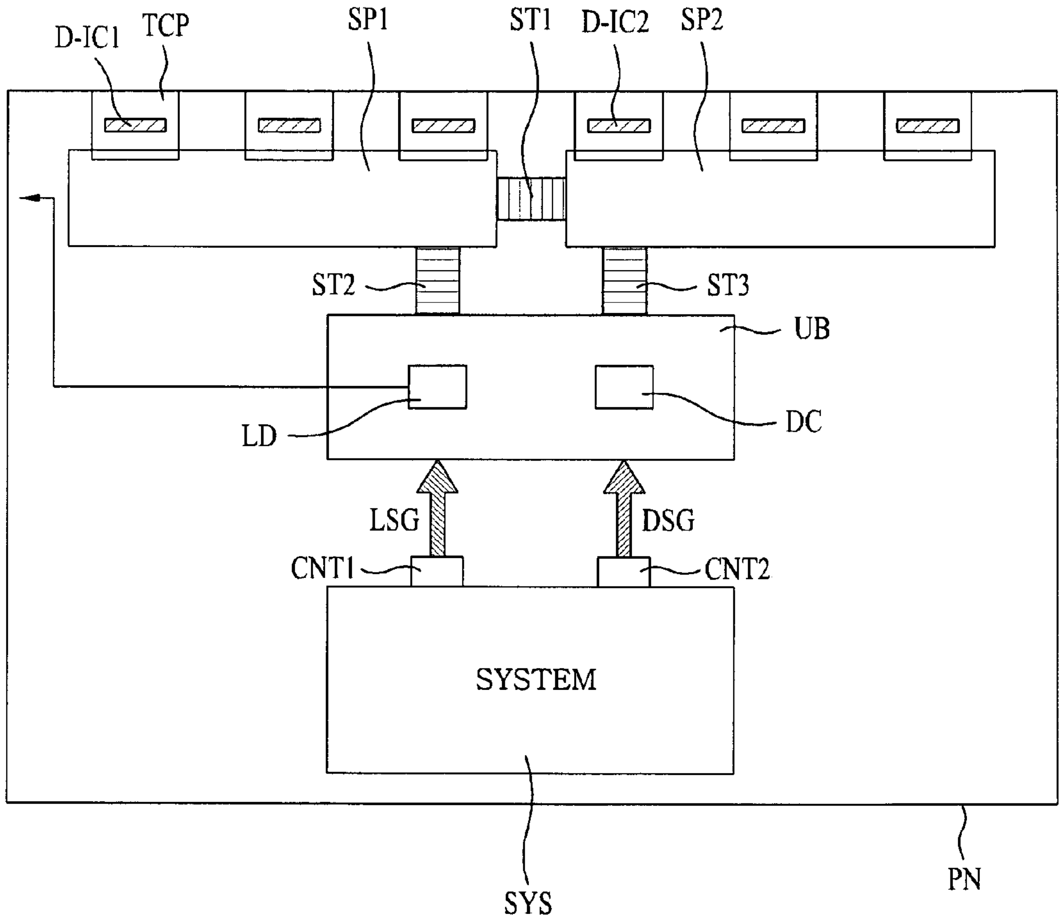
FIG. 7 is a view illustrating an LCD device according to a seventh embodiment of the present invention.

FIG. 7 is a view illustrating an LCD device according to a seventh embodiment of the present invention.

The LCD device according to the seventh embodiment of the present invention is similar to that of the sixth embodiment. However, the light source driver LD mounted on the unified board UB included in the LCD device according to the seventh embodiment of the present invention generates a single light source drive signal, and supplies the light source drive signal to the light source unit.

The light source unit includes a plurality of light sources to emit light. The light sources are arranged along one edge of the liquid crystal panel PN.

The light source drive signal from the light source driver LD is supplied to the light sources arranged along a one-side edge of the liquid crystal panel PN.

Eighth Embodiment

Figure 8:
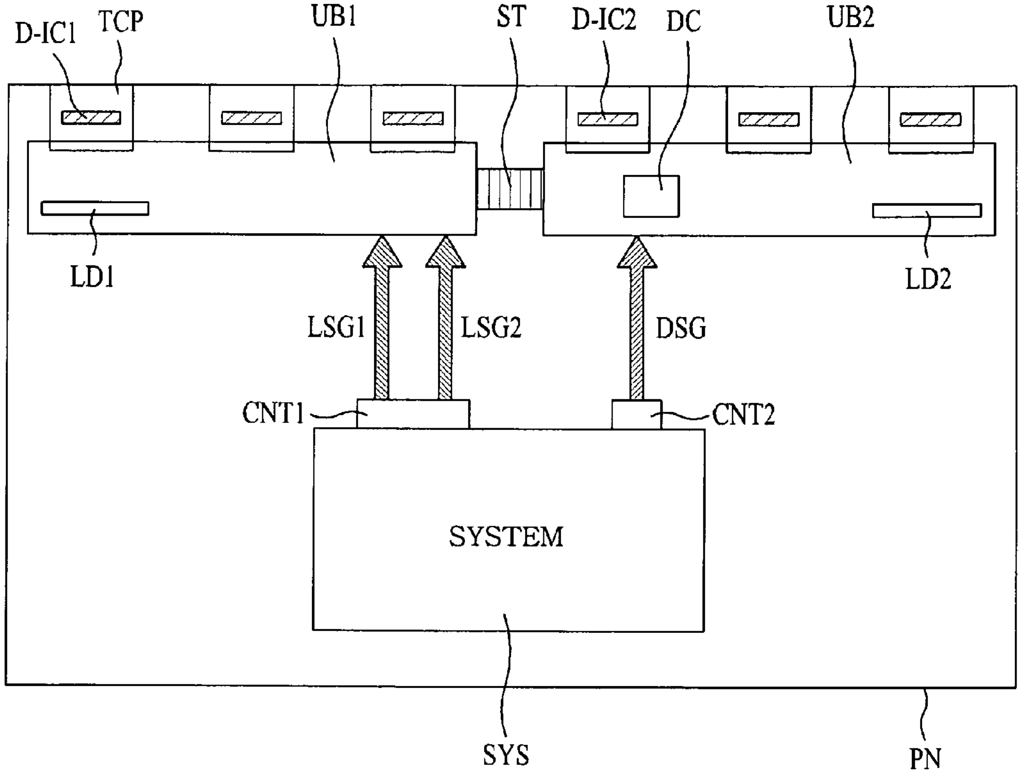
FIG. 8 is a view illustrating an LCD device according to an eighth embodiment of the present invention.

FIG. 8 is a view illustrating an LCD device according to an eighth embodiment of the present invention.

As shown in FIG. 8, the LCD device according to the eighth embodiment of the present invention includes a liquid crystal panel PN having first and second displays to display an image, a plurality of first data drive ICs D-IC1 connected between a one-side portion of the liquid crystal panel PN and a first unified board UB1, to drive data lines arranged on the first display of the liquid crystal panel PN, a plurality of second data drive ICs D-IC2 connected between the one-side portion of the liquid crystal panel PN and a second unified board UB2, to drive data lines arranged on the second display of the liquid crystal panel PN, and a light source unit to provide light to the liquid crystal panel PN. The LCD device also includes a signal transmitter ST connected between the first unified board UB1 and the second unified board UB2. The first unified board UB1 is formed with a first light source driver LD1 to drive a plurality of first light sources included in the light source unit. The second unified board UB2 is formed with a second light source driver LD1 to drive a plurality of second light sources included in the light source unit. A drive circuit DC to drive the first and second data drive ICs D-IC1 and D-IC2 is formed on one of the first and second unified boards UB1 and UB2. Although FIG. 8 illustrates an example in which the drive circuit DC is mounted on the second unified board UB2, the drive circuit DC may be mounted on the first unified board UB1, in place of the second unified board UB2.

The LCD device according to the eighth embodiment of the present invention further includes a system SYS. The system SYS generates a first light source unit control signal LSG1 to control operation of the first light source driver LD1, a second light source unit control signal LSG2 to control operation of the second light source driver LD2, and a drive circuit control signal DSG to control operation of the drive circuit DC. The system SYS supplies the control signals LSG1, LSG2, and DSG to the first and light source drivers LD1 and LD2, and drive circuit DC.

The first light source unit control signal LSG1 is supplied to the first light source driver LD1 via the first unified board UB1. The second light source unit control signal LSG2 is supplied to the second light source driver LD2 via the first unified board UB1, signal transmitter ST, and second unified board UB2.

As shown in FIG. 8, the system SYS includes first and second connectors CNT1 and CNT2. The first connector CNT1 includes a plurality of first output pins to output the first light source unit control signal LSG1, and a plurality of second output pins to output the second light source unit control signal LSG2. The second connector CNT2 includes a plurality of output pins to output the drive circuit control signal DSG.

Alternatively, the first connector CNT1 may be divided into two connectors. In this case, one connector includes a plurality of output pins to output the first light source unit control signal LSG1, whereas the other connector includes a plurality of output pins to output the second light source unit control signal LSG2.

Alternatively, a single connector may be used in place of the first and second connectors CNT1 and CNT2. In this case, the single connector includes a plurality of first output pins to output the first light source unit control signal LSG1, a plurality of second output pins to output the second light source unit control signal LSG2, and a plurality of third output pins to output the drive circuit control signal DSG.

Ninth Embodiment

Figure 9:
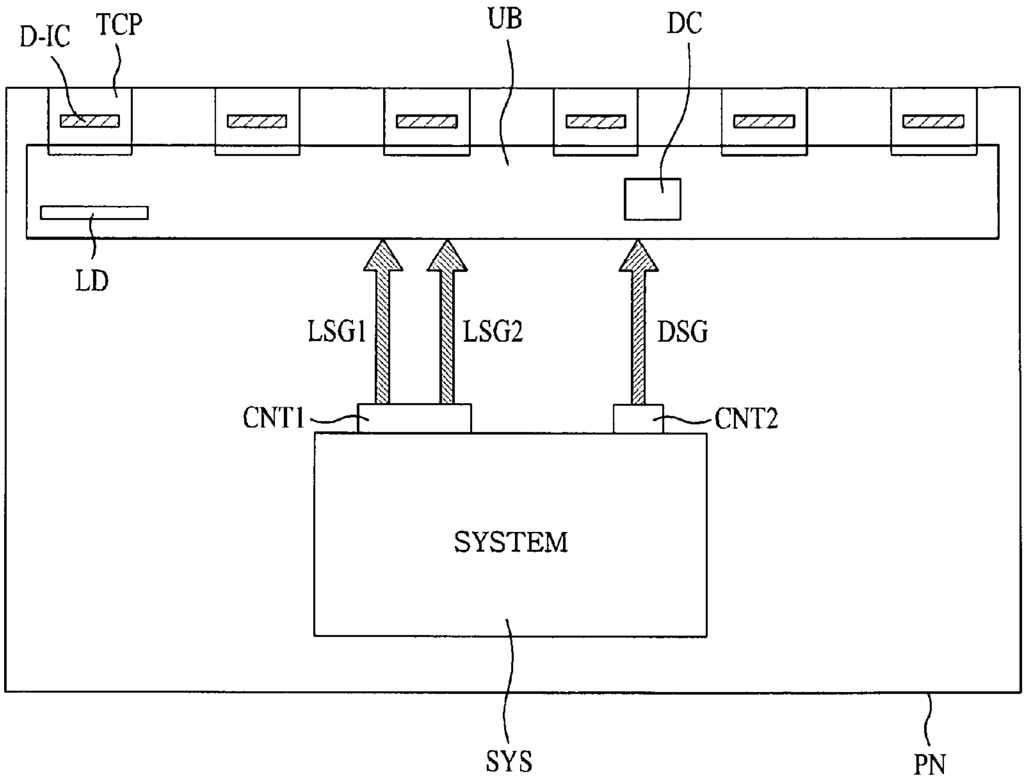
FIG. 9 is a view illustrating an LCD device according to a ninth embodiment of the present invention.

FIG. 9 is a view illustrating an LCD device according to a ninth embodiment of the present invention.

As shown in FIG. 9, the LCD device according to the ninth embodiment of the present invention includes a liquid crystal panel PN having a display to display an image, a plurality of data drive ICs D-IC connected between a one-side portion of the liquid crystal panel PN and a unified board UB, to drive data lines arranged on the display of the liquid crystal panel PN, and a light source unit to provide light to the liquid crystal panel PN. The unified board UB is formed with a light source driver LD to drive the light source unit, and a drive circuit DC to drive the data drive ICs D-IC1.

The LCD device according to the ninth embodiment of the present invention further includes a system SYS. The system SYS generates a light source unit control signal LSG to control operation of the light source driver LD, and a drive circuit control signal DSG to control operation of the drive circuit DC. The system SYS supplies the control signals LSG and DSG to the light source driver LD and drive circuit DC.

As shown in FIG. 9, the system SYS includes first and second connectors CNT1 and CNT2. The first connector CNT1 includes a plurality of output pins to output the light source unit control signal LSG, whereas the second connector CNT2 includes a plurality of output pins to output the drive circuit control signal DSG.

Alternatively, a single connector may be used in place of the first and second connectors CNT1 and CNT2. In this case, the single connector includes a plurality of first output pins to output the light source unit control signal LSG, and a plurality of second output pins to output the drive circuit control signal DSG.

Apparent from the above description, the present invention provides various effects.

That is, it is possible to reduce the number of printed circuit boards and the number of signal transmitters, and thus to reduce manufacturing costs, by unifying the printed circuit boards into one printed circuit board, and mounting a light source driver and a drive circuit on the unified printed circuit board.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:

a liquid crystal panel having first and second displays to display an image;

a plurality of first data drive integrated circuits connected between a one-side portion of the liquid crystal panel and a first unified board, to drive data lines arranged on the first display of the liquid crystal panel;

a plurality of second data drive integrated circuits connected between the one-side portion of the liquid crystal panel and a second unified board, to drive data lines arranged on the second display of the liquid crystal panel;

a light source unit to provide light to the liquid crystal panel;

a signal transmitter connected between the first unified board and the second unified board;

a first light source driver to drive a plurality of first light sources included in the light source unit;

a second light source driver to drive a plurality of second light sources included in the light source unit;

a system to generate a first light source unit control signal to control an operation of the first light source driver, a second light source unit control signal to control an operation of the second light source driver, and a drive circuit control signal to control an operation of a drive circuit, and to supply the generated control signals to the first and light source drivers, and drive circuit;

wherein, one end of the signal transmitter is directly connected to the first unified board, and the other end of the signal transmitter is directly connected to the second unified board;

the first light source driver is formed on the first unified board;

the second light source driver is formed on the second unified board;

the drive circuit to drive the first and second data drive integrated circuit is formed on one of the first and second unified boards, the first and second unified boards are positioned at a back surface of the liquid crystal panel;

the first light source unit control signal is applied to the first light source driver via the first unified board; and the second light source unit control signal is applied to the second light source driver via the first unified board, signal transmitter and second unified board.

* * * * *